(No Model.) 2 Sheets—Sheet 1.
K. SCHMITT.
VELOCIPEDE.
No. 371,374. Patented Oct. 11, 1887.
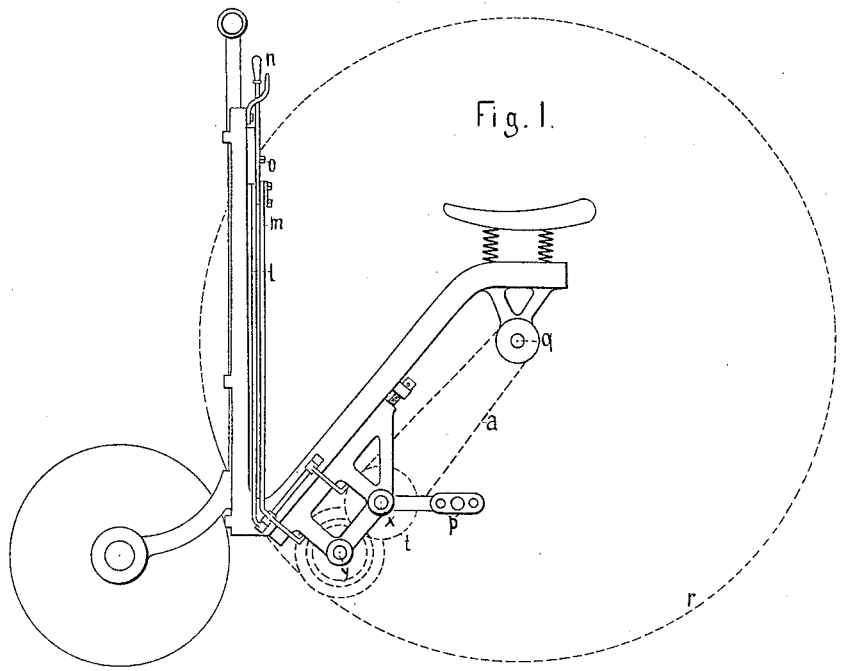
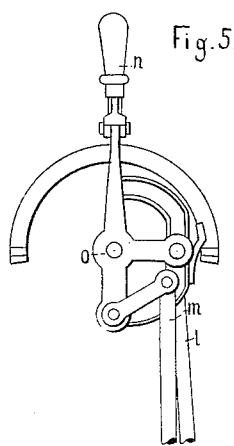
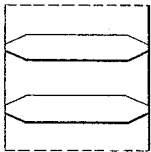
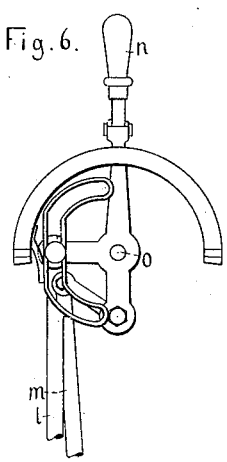

(No Model.) 2 Sheets—Sheet 2.

K. SCHMITT.
VELOCIPEDE.

No. 371,374. Patented Oct. 11, 1887.

Figure 2:
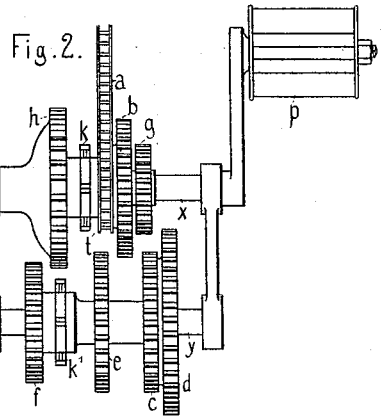
Figure 3:
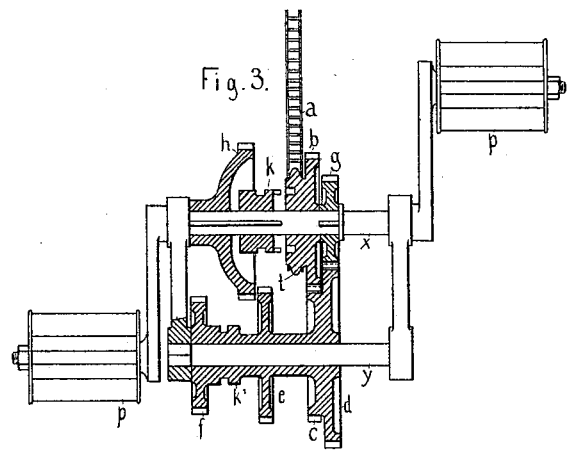

Witnesses:

Inventor:
Karl Schmitt
by Marcellus Bailey
his attorney.

ically view of my velocipede. Figs. 2, 3, and
UNITED STATES PATENT OFFICE.

KARL SCHMITT, OF ZITTAU, SAXONY, GERMANY.

VELOCIPEDE.

SPECIFICATION forming part of Letters Patent No. 371,374, dated October 11, 1887.

Application filed July 13, 1887. Serial No. 244,169. (No model.)

*To all whom it may concern:*

Be it known that I, KARL SCHMITT, a subject of the King of Saxony, and residing at Zittau, in the Kingdom of Saxony, German Empire, gardener, have invented new and useful Improvements in Velocipedes, of which the following is a specification.

My invention relates to velocipedes by the pedal-crank axle of which the motion is transmitted to the driving-wheels by means of a chain and suitable intermediate mechanism. In these, as well as in all other known velocipedes, the rider can only effect a change in the velocity of motion by a corresponding change in the angular velocity of the pedal cranks.

The subject of my invention is an improved driving mechanism for velocipedes having three or more wheels, such mechanism enabling the rider to ride at different velocities, which can be varied at will, while the rotary velocity of the pedal-crank remains the same. For this purpose below the pedal-crank axle is arranged the shaft of a connecting-gearing, and upon the said axle and this shaft are suitable intermediate wheels and couplings, (similar to the sets of wheels in gearing of lathes,) by means of which the driving-chain is moved either at the velocity that corresponds with the velocity of the pedal-crank axle or at a velocity that is greater or smaller than the above-mentioned velocity of the pedal-crank axle. The necessary displacement of the couplings and intermediate wheels is effected by the hand of the driver, preferably by means of a hand-lever and suitable rods or levers and an adjusting bow or quadrant.

Figure 4:
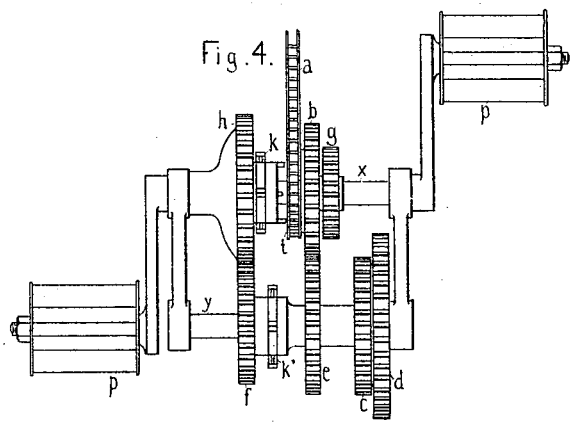

In the drawings, Figure 1 represents a schematical view of my velocipede. Figs. 2, 3, and 4 show the improved driving mechanism in three different positions, corresponding to the three velocities to be obtained; Figs. 5 and 6, the adjusting mechanism, Fig. 5 being a front view, Fig. 6 a back view; and Fig. 7 represents the construction of the teeth of the wheels preferably to be used.

All the desired adjustments are effected by the rider by means of a hand-lever, $n$, within convenient reach, which lever can be fixed in three definite positions, that shown in Figs. 5 and 6 being the central position. The motion of the hand-lever $n$ is communicated through two other levers, $l$ and $m$, to the wheels by means of couplings arranged on two shafts and capable of sliding thereon. Of these the upper one, $x$, is the driving-shaft, carrying the treadles $p$, and parallel therewith is arranged the auxiliary shaft $y$.

Upon the auxiliary shaft are a number of toothed wheels, $f\ e\ c\ d$, the size of which may be varied according as the difference in the three velocities for riding is to be large or small. These wheels upon the auxiliary shaft are solidly connected with each other. They are, however, adapted to turn and slide freely upon the auxiliary shaft, which is firmly connected with its supporting frame.

Upon the main shaft $x$ is a chain-wheel, $t$, which guides the driving-chain $a$. This chain-wheel is firmly united with a toothed wheel, $b$, arranged next to it on the driving-shaft $x$. Both can, however, turn freely upon the main shaft as soon as they are thrown out of gear with the teeth of coupling $k$. A spur-wheel, $g$, is fixed upon the driving-shaft $x$, and said shaft also carries another toothed wheel, $h$, fixed on it.

A motion of the hand-lever $n$ in the manner hereinafter set forth causes a displacement of the wheels upon the auxiliary axis $y$ to the right or left, and the coupling $k$ disengages, as shown in Figs. 3, 4, or engages (see Fig. 2) at the same time on the main shaft—that is to say, liberates the chain-wheel $t$, together with the chain $a$, or renders them dependent on the motion of the driving-shaft $x$. By this displacement and the consequent engagement of different wheels of the two shafts the various velocities for riding that are desired are attained.

Fig. 1 is a general view, and shows how the chain $a$ transmits the power exerted upon the pedals $p$ to the axle $q$, and thereby to the large driving-wheels $r$. When the teeth of the coupling $k$ of the driving-shaft are engaged with the chain-wheel $t$, (see Fig. 2,) the motion of the pedals $p$ is transmitted directly to the chain $a$ and thereby to the driving-wheels. The auxiliary shaft $y$ and the other wheels thereon do not come into operation. In this case riding at the ordinary velocity takes place. When, however, the teeth of the coupling $k$ on the driving-shaft are disengaged from the chain-wheel $t$, as shown in Fig. 3, the said wheel and the toothed wheel $b$, fixed thereto, are free to turn upon the said shaft $x$. The spur-wheel $g$, keyed upon the driving-shaft $x$, transmits the motion of the pedals to the wheel $d$ on the auxiliary shaft, and thereby to the wheel $c$ on said shaft. The latter transmits the motion to the toothed wheel $b$ on the driving-shaft, which is connected to the chain-wheel $t$, and thereby to the chain $a$. Now, as the spur-wheel $g$, fixed on the driving-shaft, is smaller than the wheel $d$ on the auxiliary shaft $y$, which gears with the former, the latter will turn so much slower; but besides, as the second wheel, $c$, on the auxiliary shaft, and the wheel $b$, connected with the chain-wheel $t$, are of the same size, the chain-wheel and chain $a$ will move more slowly. From this results a much-increased transmission of power which can be used to ascend greater inclinations than would be possible with the ordinary mode of riding. When it is desired to impart a greater velocity to the driving-wheels, the coupling $k$ on the driving-shaft is disengaged, as before. Therefore the chain-wheel $t$ and the toothed wheel $b$, fixed thereto, are free to turn upon the driving shaft $x$. In this case (represented by Fig. 4) the wheel $h$, fixed upon the driving-shaft $x$, transmits the motion of the pedals to a wheel, $f$, of smaller size, on the auxiliary shaft $y$, and thereby, through another wheel, $e$, on said shaft, to the wheel $b$, fixed to the chain-wheel $t$ on the driving-shaft, and thus to the chain $a$. Now, as the said wheel $h$ on the driving-shaft is larger than the wheel $f$ on the auxiliary shaft in gear therewith, the latter will turn so much the quicker, which quicker motion is transmitted to the driving-wheels, as above described. This position of the gearing is usefully applied if on a plane; or, with a slight descent of the way, the driver has still power in excess and wishes to use it to increase the velocity of the device.

The hand-lever $n$ turns upon a fixed point, $o$. The two connecting-levers $l$ and $m$ lead to the hand-lever in such a manner that the one, $m$, is before and the other, $l$, behind the hand-lever from the rider. The end of the hind connecting-lever, $l$, is slotted and brought in connection with the hand-lever $n$ in such a manner that if the hand-lever is moved from the perpendicular position to the right or left the hind connecting-lever, $l$, and with this the tooth of the coupling $k$ on the driving-shaft, with which the said lever engages, can only at the commencement of the motion of the hand-lever to the right or left make a motion of a certain limited length, and invariably only to one side. During the back motion of the hand-lever $n$ from the position on the right or left the certain limited motion of the hind connecting-lever, $l$, together with the tooth of the coupling $k$, takes place at the end of the stroke of the hand-lever. The front connecting-lever, $m$, is connected with the hand-lever $n$ in such a manner that the former, which engages with a tooth of the coupling $k'$ on the auxiliary shaft $y$, takes part in the full motion to the right or to the left. In the perpendicular position of the hand-lever $n$ the tooth of the coupling $k$ on the driving-shaft $x$ is engaged, and the tooth of the coupling $k'$ on the auxiliary shaft $y$ holds all the wheels on the auxiliary axis in the position in which they do not come into operation. (See Fig. 2.) If the hand-lever $n$ is placed to the left or right, the coupling $k$ on the driving-shaft disengages, and only when this has been completely effected the engagement of the corresponding toothed wheels takes place.

The toothed wheels must be allowed to slide freely upon the auxiliary shaft $y$ to an extent equal to the travel of the coupling $k$ on its shaft till the engagement takes places. This is necessary to obviate breakage, because no wheel on the auxiliary shaft must be engaged to the least extent if the coupling $k$ on the driving-shaft is not completely disengaged. The teeth of the wheels on both the axes $x$ and $y$ are suitably pointed laterally, in order that they may easily engage and not strike upon one another from the side.

What I claim, and desire to secure by Letters Patent, is—

The combination, with a main or pedal-crank axle, $x$, of an auxiliary shaft, $y$, toothed wheels $h\ b\ g$, connecting gearing-wheels $f\ e\ c\ d$, couplings $k$ and $k'$, and means for displacing the said couplings and wheels on their shafts by lever $n$, substantially as set forth.

In testimony whereof I have hereunto set my hand in the presence of two subscribing witnesses.

KARL SCHMITT.

Witnesses:
HENRY SPRINGMANN,
ARTHUR MARKS.